(12) United States Patent
Jiang et al.

(10) Patent No.: US 9,897,829 B2
(45) Date of Patent: Feb. 20, 2018

(54) SEALANT CURING DEVICE AND PACKAGING METHOD

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Liangliang Jiang, Beijing (CN); Bo Zhang, Beijing (CN); Cong Tan, Beijing (CN); Chengyong Zhan, Beijing (CN)

(73) Assignees: BOE TECHNOLOGY GROUP CO., LTD. (CN); HEFEI XINSHENG OPTOELECTRONICS TECHNOLOGY CO., LTD. (CN)

( * ) Notice: Subject to any disclaimer, the term of this patent is extended or adjusted under 35 U.S.C. 154(b) by 0 days.

(21) Appl. No.: 15/135,102

(22) Filed: Apr. 21, 2016

(65) Prior Publication Data
US 2016/0370611 A1     Dec. 22, 2016

(30) Foreign Application Priority Data
Jun. 17, 2015   (CN) .......................... 2015 1 0338156

(51) Int. Cl.
*G02F 1/13*     (2006.01)
*G02F 1/1339*   (2006.01)
(52) U.S. Cl.
CPC .......... *G02F 1/1303* (2013.01); *G02F 1/1339* (2013.01)

(58) Field of Classification Search
None
See application file for complete search history.

(56) References Cited

U.S. PATENT DOCUMENTS

| 4,585,693 A * | 4/1986 | DeBergalis | C08F 8/00 428/324 |
|---|---|---|---|
| 4,710,539 A | 12/1987 | Siadat et al. | |
| 4,820,365 A | 4/1989 | Brumm et al. | |
| 7,291,670 B2 | 11/2007 | Fehn et al. | |

(Continued)

FOREIGN PATENT DOCUMENTS

| CN | 103676339 A | 3/2014 |
|---|---|---|
| CN | 203982043 U | 12/2014 |

(Continued)

OTHER PUBLICATIONS

First Office Action for Chinese Application No. 201510338156.5, dated May 27, 2017, 7 Pages.

(Continued)

*Primary Examiner* — Michael Logie
(74) *Attorney, Agent, or Firm* — Brooks Kushman P.C.

(57) ABSTRACT

The present disclosure provides a sealant curing device and a packaging method. The sealant curing device includes a bearing platform on which a display panel is placed, and a light conversion layer arranged on the bearing platform and configured to convert a light beam at a first wavelength into a light beam at a second wavelength. The light beam at the first wavelength is one of a UV light beam and an IR light beam, and the light beam at the second wavelength is the other one of the UV light beam and the IR light beam.

14 Claims, 3 Drawing Sheets

(56) References Cited

U.S. PATENT DOCUMENTS

| | | | |
|---|---|---|---|
| 2004/0090586 A1* | 5/2004 | Choo | G02F 1/1339 349/153 |
| 2006/0266643 A1* | 11/2006 | Le | C23C 14/3407 204/298.12 |
| 2010/0216365 A1* | 8/2010 | Song | G02F 1/1303 445/25 |
| 2011/0063561 A1* | 3/2011 | Song | G02F 1/1339 349/153 |
| 2014/0043829 A1* | 2/2014 | Wu | G02B 26/008 362/324 |
| 2016/0116650 A1* | 4/2016 | Jiang | G02B 5/201 359/359 |
| 2017/0092796 A1* | 3/2017 | Ishiguro | H01L 31/055 |

FOREIGN PATENT DOCUMENTS

| | | | | |
|---|---|---|---|---|
| CN | 104297990 A | | 1/2015 | |
| JP | 09260820 A | * | 10/1997 | ............... H05K 3/32 |
| JP | 2007322851 A | | 12/2007 | |
| JP | 2010261048 A | | 11/2010 | |
| WO | WO 2015046442 A1 | * | 4/2015 | ............. C09K 11/06 |

OTHER PUBLICATIONS

Li et al., NaYF4: Yb,Tm/CdS Composite as a Novel Near-infrared-driven Photocatalyst, Applied Catalysis B: Environmental 100, dated Aug. 27, 2010, 7 Pages.

Liu et al., Progress of Visible-light and Near-infrared-driven Photocatalysis Based on Upconversion Luminescence, dated Dec. 30, 2012, 7 Pages.

Liu et al., Application of UV—vis Conversion Agent/TiO2 Composite Photocatalyst in Marine Oil Pollution Treatment, dated Aug. 2014, 5 Pages.

Qin et al., Near-infrared Photocatalysis Based on YF3:Yb3+, Tm3+/TiO2 Core/Shell Nanoparticles, Dated Jan. 23, 2010, 4 Pages.

* cited by examiner

SEALANT CURING DEVICE AND PACKAGING METHOD

CROSS-REFERENCE TO RELATED APPLICATION

The present application claims a priority of the Chinese Patent Application No. 201510338156.5 filed on Jun. 17, 2015, which is incorporated herein by reference in its entirety.

TECHNICAL FIELD

The present disclosure relates to the field of display technology, in particular to a sealant curing device and a packaging method.

BACKGROUND

A conventional thin film transistor-liquid crystal display (TFT-LCD) panel mainly includes an array substrate, a color filter substrate, and a liquid crystal layer sealed between the array substrate and the color filter substrate through a sealant. During the manufacture of the TFT-LCD panel, after the array substrate has been aligned with the color filter substrate, it is required to assembly them to form a cell. For a cell formation process, its critical steps include injecting liquid crystals, coating the sealant, arranging the two substrates opposite to each other to form a cell, and curing the sealant. After the cell formation has been completed, the liquid crystals will be diffused toward the sealant. At this time, when the sealant is not completely cured, the liquid crystals will be polluted, resulting in dramatic degradation of the panel quality. Hence, the image quality of the display panel depends directly on the curing efficiency and curing evenness. Currently, a conventional sealant curing process mainly includes irradiating the sealant with an ultraviolet (UV) ray to cure a photosensitive component in the sealant, and then curing a thermosensitive component in the sealant in a heating furnace through an infrared (IR) ray or thermal transmission, thereby to completely cure the sealant.

Although various methods are used in the related art to cure the seal, these methods all include a UV irradiating step and a heating step. There are the following drawbacks for these methods. A tact time, including a curing time and a transfer time between different curing devices, will be too long. In addition, a curing effect will be adversely affected. The sealant cannot be completely cured by a pre-curing step using the UV ray, and before the display panel has been transferred to the heating furnace, the liquid crystals may be in contact with the sealant, which results in sealant collapse and liquid crystal pollution.

SUMMARY

An object of the present disclosure is to provide a sealant curing device and a packaging method, so as to shorten the tact time, and prevent the occurrence of imperfect packaging and pollution of liquid crystals when a display panel is transferred between different curing devices.

In one aspect, the present disclosure provides in some embodiments a sealant curing device, including a bearing platform on which a display panel is placed, and a light conversion layer arranged on the bearing platform and configured to convert a light beam at a first wavelength into a light beam at a second wavelength. The light beam at the first wavelength is one of a UV light beam and an IR light beam, and the light beam at the second wavelength is the other one of the UV light beam and the IR light beam.

Alternatively, the light beam at the first wavelength is the IR light beam, the light beam at the second wavelength is the UV light beam, and the light convention layer is made of an up-conversion light-emitting material.

Alternatively, the up-conversion light-emitting material is one selected from the group consisting of $NaYF_4$:Yb, Tm; $NaYF_4$:Er, Yb; $YF_3$:$Yb^{3+}$, $Tm^{3+}$; and $CaF_2$($Er^{3+}$).

Alternatively, the first wavelength is 600 nm to 1000 nm.

Alternatively, the light beam at the first wavelength is the UV light beam, the light beam at the second wavelength is the IR light beam, and the light conversion layer is made of CdS, CdSe, CdTe or ZnSe.

Alternatively, the first wavelength is 200 nm to 300 nm.

Alternatively, the sealant curing device further includes a light reflection layer arranged between the light conversion layer and the bearing platform.

Alternatively, when the display panel is placed onto the bearing platform, the light conversion layer completely covers a projection of a sealant layer in the display panel onto the bearing platform.

Alternatively, the light conversion layer covers at least a part of a surface of the bearing platform.

Alternatively, a size and a shape of the light conversion layer are set in accordance with a size and a shape of the sealant layer in the display panel.

Alternatively, the light conversion layer is of an annular structure corresponding to the sealant layer.

In another aspect, the present disclosure provides in some embodiments a packaging method, including steps of: placing a display panel onto a bearing platform of a sealant curing device in such a manner that a sealant layer of the display panel is exactly aligned with a light conversion layer; and irradiating the sealant layer of the display panel with a light beam at a first wavelength at a side of the display panel away from the bearing platform. The light beam at the first wavelength passing through the sealant layer is converted by the light conversion layer into a light beam at a second wavelength, and the light beam at the second wavelength is reflected toward the sealant layer.

Alternatively, the sealant layer in the display panel has a thickness of 3 μm to 6 μm.

Alternatively, the light beam at the first wavelength is an IR light beam, the light beam at the second wavelength is a UV light beam, the light conversion layer is made of an up-conversion light-emitting material, the up-conversion light-emitting material is one selected from the group consisting of $NaYF_4$:Yb, Tm; $NaYF_4$:Er, Yb; $YF_3$:$Yb^{3+}$, $Tm^{3+}$; and $CaF_2$($Er^{3+}$), and the first wavelength is 600 nm to 1000 nm.

Alternatively, the light beam at the first wavelength is a UV light beam, the light beam at the second wavelength is an IR light beam, the light conversion layer is made of CdS, CdSe, CdTe or ZnSe, and the first wavelength is 200 nm to 300 nm.

Alternatively, a light reflection layer is arranged between the light conversion layer and the bearing platform.

Alternatively, when the display panel is placed onto the bearing platform, the light conversion layer completely covers a projection of the sealant layer in the display panel onto the bearing platform.

Alternatively, the light conversion layer covers at least a part of a surface of the bearing platform.

Alternatively, a size and a shape of the light conversion layer are set in accordance with a size and a shape of the sealant layer in the display panel.

Alternatively, the light conversion layer is of an annular structure corresponding to the sealant layer.

According to the sealant curing device and the packaging method in the embodiments of the present disclosure, the light conversion layer is arranged on the bearing platform, so as to convert the light beam at one wavelength into the light beam at the other wavelength. In this way, when only one light source is provided, the sealant in the display panel may be irradiated by the light beams at different wavelengths simultaneously, so as to perform the two steps in a conventional curing process simultaneously. As a result, it is able to shorten the tact time, and prevent the occurrence of imperfect packaging and pollution of liquid crystals when the display panel is transferred between different curing devices.

DETAILED DESCRIPTION OF THE EMBODIMENTS

The present disclosure will be described hereinafter in conjunction with the drawings and embodiments. The following embodiments are for illustrative purposes only, but shall not be used to limit the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

The present disclosure provides in some embodiments a sealant curing device, which includes a bearing platform on which a display panel is placed, and a light conversion layer arranged on the bearing platform and configured to convert a light beam at a first wavelength into a light beam at a second wavelength. The light beam at the first wavelength is one of a UV light beam and an IR light beam, and the light beam at the second wavelength is the other one of the UV light beam and the IR light beam.

According to the sealant curing device in the embodiments of the present disclosure, the light conversion layer is arranged on the bearing platform, so as to convert the light beam at one wavelength into the light beam at the other wavelength. In this way, when only one light source is provided, the sealant in a display panel may be irradiated by the light beams at different wavelengths simultaneously, so as to perform the two steps in a conventional curing process simultaneously. As a result, it is able to shorten the tact time, and prevent the occurrence of imperfect packaging and pollution of liquid crystals when the display panel is transferred between different curing devices.

Figure 1:
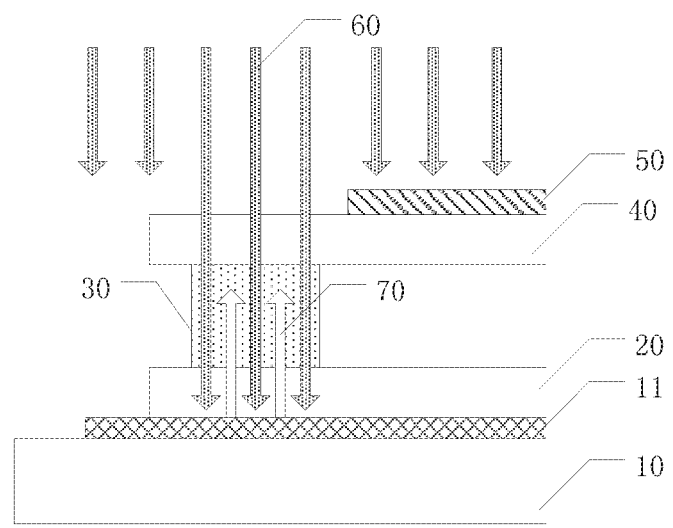
FIG. 1 is a schematic view showing a situation where a sealant in a display panel is cured by a sealant curing device according to one embodiment of the present disclosure.

In an alternative embodiment, the light conversion layer may be made of an up-conversion light-emitting material, so as to convert the IR light beam into the UV light beam. To be specific, as shown in FIG. 1, when curing a sealant layer 30 in the display panel, the display panel is placed onto the bearing platform 10 in such a manner that the sealant layer 30 is completely arranged above light conversion layer 11. Then, the IR light beam 60 passes through a transparent region of a mask plate 50 and a color filter substrate 40 and then enters the sealant layer 30. A thermosensitive component in the sealant layer absorbs the IR light beam at a relatively large wavelength and with relatively low energy, and then is thermally cured. In addition, a part of the IR light beams pass through the sealant layer and an array substrate 20, and then are absorbed by the light conversion layer 11. At this time, the IR beams at a relatively large wavelength and with relatively low energy are converted into the UV light beams 70 at a relatively small wavelength and with relatively high energy. The light beams are then reflected toward the sealant layer 30, so as to decompose a photosensitive component in the sealant layer and release free radicals as a catalyst, thereby to accelerate the photocuring of the sealant. After a period of time, the sealant may be completely cured. During the above procedure, it is able to thermocure and photocure the sealant simultaneously. As a result, it is able to shorten the tact time, and prevent the occurrence of imperfect packaging and pollution of liquid crystals when a display panel is transferred between different curing devices.

The up-conversion light-emitting material may be one selected from the group consisting of $NaYF_4$:Yb, Tm; $NaYF_4$:Er, Yb; $YF_3$:$Yb^{3+}$, $Tm^{3+}$; and $CaF_2$($Er^{3+}$). For example, $NaYF_4$:Er, Yb may be used as the up-conversion light-emitting material, where $NaYF_4$ serves as a matrix, Er serves as an initiator, and Yb serves as a sensitizer. The up-conversion light-emitting material may be formed on a surface of the bearing platform by coating.

Alternatively, in order to further reduce the time desired for curing the sealant layer, when the light conversion layer is made of the up-conversion light-emitting material, the sealant layer may be irradiated by the IR light beam at a wavelength within a range from 600 nm to 1000 nm, e.g., 700 nm, 800 nm or 900 nm.

Figure 2:
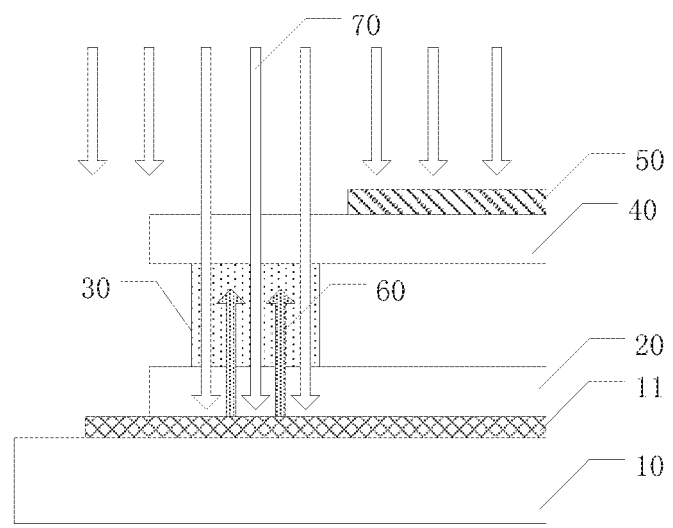
FIG. 2 is another schematic view showing a situation where the sealant in the display panel is cured by the sealant curing device according to one embodiment of the present disclosure.

In addition, the light conversion layer may also be made of CdS, CdSe, CdTe or ZnSe, so as to convert the UV light beam into the IR light beam. To be specific, as shown in FIG. 2, when curing a sealant layer 30 in the display panel, the display panel is placed onto the bearing platform 10 in such a manner that the sealant layer 30 is completely arranged above light conversion layer 11. Then, the UV light beam 70 passes through a transparent region of the mask plate 50 and the color filter substrate 40 and then enters the sealant layer 30, so as to cure a photosensitive component in the sealant layer. In addition, a part of the UV light beams pass through the sealant layer and the array substrate 20, and then are absorbed by the light conversion layer 11. At this time, the UV light beams are converted into the IR light beams 60. The IR light beams 60 are then reflected toward the sealant layer 30, so as to cure a thermosensitive component in the sealant. After a period of time, the sealant may be completely cured. During the above procedure, it is able to thermocure and photocure the sealant simultaneously. As a result, it is able to shorten the tact time, and prevent the occurrence of imperfect packaging and pollution of liquid crystals when a display panel is transferred between different curing devices.

Alternatively, the sealant layer may be irradiated by the UV light beam at a wavelength within a range from 200 nm to 300 nm, e.g., 230 nm, 250 nm or 280 nm, so as to further reduce the curing time.

Figure 3:
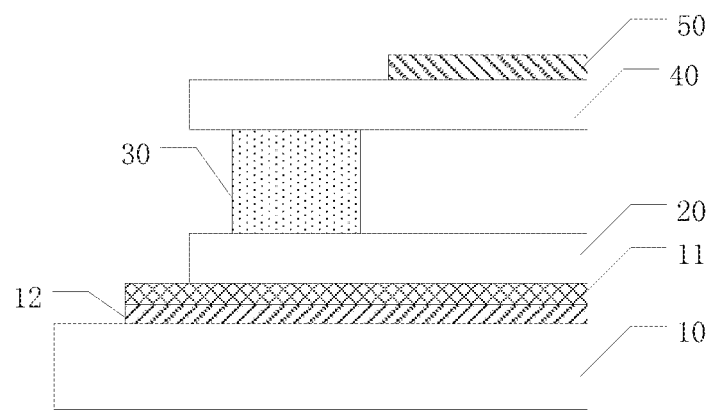
FIG. 3 is a schematic view showing the sealant curing device with alight reflection layer on a bearing platform according to one embodiment of the present disclosure.

Alternatively, in order to reduce the light loss and increase the quantity of the light beams converted by the light conversion layer reflected toward the sealant layer, a light reflector layer 12 may be arranged between the light conversion layer 11 and the bearing platform 10, as shown in FIG. 3.

In addition, in order to prevent the occurrence of an excessively large difference between the curing rates for the photosensitive component and the thermosensitive component during the packaging, the sealant layer in the display panel may not be too thick. The sealant layer may have a thickness of 3 µm to 6 µm, 4 µm or 5 µm.

Figure 4:
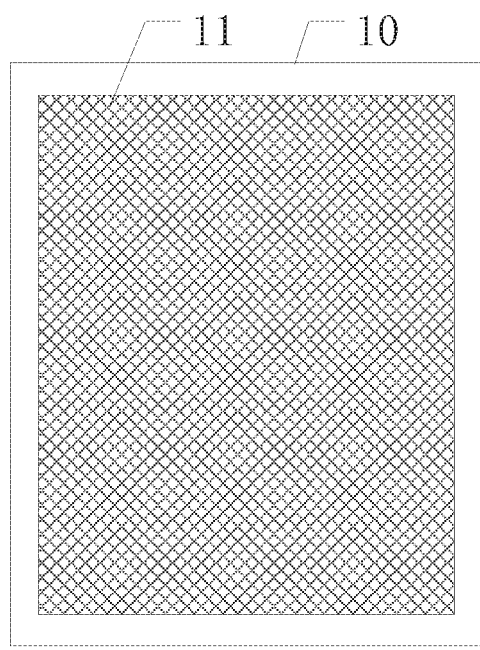
FIG. 4 is a schematic view showing the sealant curing device with a light conversion layer on the bearing platform according to one embodiment of the present disclosure.
Figure 5:
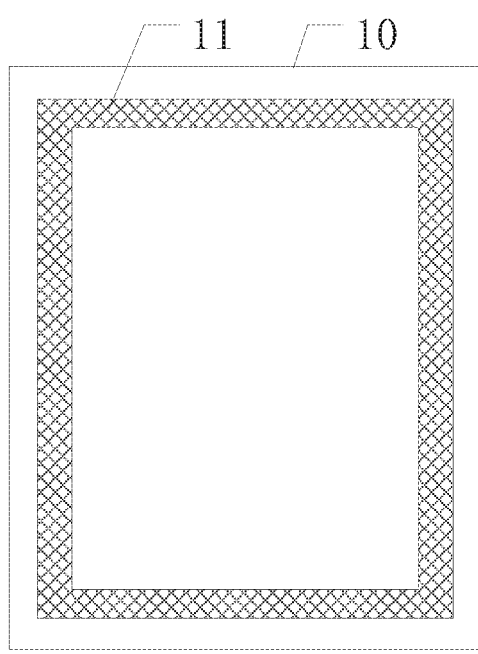
FIG. 5 is another schematic view showing a the sealant curing device with the light conversion layer on the bearing platform according to one embodiment of the present disclosure.

In the embodiments of the present disclosure, a size and a shape of the light conversion layer on the bearing platform may be set in accordance with the practical need, as long as a projection of the sealant layer onto the bearing platform is completely located on the light conversion layer when the display panel is placed onto the bearing platform. In this way, it is able for each part of the sealant layer to receive the light beam converted by the light conversion layer. For example, as shown in FIG. 4, a planar light conversion layer 11 may be formed on the bearing platform, so as to cover a majority of, or the entire of, the surface of the bearing platform. At this time, it is unnecessary to align the sealant layer with the light conversion layer. Alternatively, the size and shape of the light conversion layer may also be set in accordance with a size and a shape of the sealant layer. For example, as shown in FIG. 5, the light conversion layer 11 may be of an annular structure corresponding to the sealant layer, so as to save materials as compared with the structure in FIG. 4.

The present disclosure further provides in some embodiments a packaging method, which includes steps of: placing a display panel onto a bearing platform of a sealant curing device in such a manner that a sealant layer of the display panel is exactly aligned with a light conversion layer; and irradiating the sealant layer of the display panel with a light beam at a first wavelength at a side of the display panel away from the bearing platform. The light beam at the first wavelength passing through the sealant layer is converted by the light conversion layer into a light beam at a second wavelength, and the light beam at the second wavelength is reflected toward the sealant layer.

The above are merely the preferred embodiments of the present disclosure. It should be appreciated that, a person skilled in the art may make further modifications and improvements without departing from the spirit of the present disclosure, and these modifications and improvements shall also fall within the scope of the present disclosure.

What is claimed is:

1. A sealant curing device, comprising:
   a bearing platform for supporting a display panel comprising a color filter substrate, an array substrate and a sealant layer between the color filter substrate and the array substrate;
   a light source configured to emit a light beam at a first wavelength;
   a light conversion layer supported above the bearing platform and configured to convert the light beam at the first wavelength into a light beam at a second wavelength to cure sealant in the sealant layer with the light beams at both the first wavelength and the second wavelength, and
   a light reflection layer arranged between the light conversion layer and the bearing platform, wherein the display panel is placeable on the light conversion layer,
   wherein the light beam at the first wavelength is an UV light beam, the light beam at the second wavelength is an IR light beam, and the light conversion layer is made of CdS, CdSe, CdTe or ZnSe.

2. The sealant curing device according to claim 1, wherein the first wavelength is 200 nm to 300 nm.

3. The sealant curing device according to claim 1, wherein when the display panel is supported on the bearing platform, the light conversion layer completely covers a projection of a sealant layer in the display panel onto the bearing platform.

4. The sealant curing device according to claim 1, wherein the light conversion layer covers at least a part of a surface of the bearing platform.

5. The sealant curing device according to claim 1, wherein a size and a shape of the light conversion layer are set in accordance with a size and a shape of a sealant layer in the display panel.

6. The sealant curing device according to claim 5, wherein the light conversion layer is of an annular structure corresponding to the sealant layer.

7. A packaging method, comprising steps of:
   placing, by a user, the display panel onto the bearing platform of the sealant curing device according to claim 1 in such a manner that the sealant layer of the display panel is exactly aligned with the light conversion layer; and
   irradiating, by the light source, the sealant layer of the display panel with the light beam at the first wavelength at a side of the display panel away from the bearing platform,
   converting, by the light conversion layer, the light beam at the first wavelength passing through the sealant layer into the light beam at the second wavelength, and
   reflecting, by the light reflection layer, the light beam at the second wavelength toward the sealant layer.

8. The packaging method according to claim 7, wherein the sealant layer in the display panel has a thickness of 3 µm to 6 µm.

9. The packaging method according to claim 7, wherein when the display panel is supported on the bearing platform, the light conversion layer completely covers a projection of the sealant layer in the display panel onto the bearing platform.

10. The packaging method according to claim 7, wherein the light conversion layer covers at least a part of a surface of the bearing platform.

11. The packaging method according to claim 7, wherein a size and a shape of the light conversion layer are set in accordance with a size and a shape of the sealant layer in the display panel.

12. The packaging method according to claim 11, wherein the light conversion layer is of an annular structure corresponding to the sealant layer.

13. A sealant curing device, comprising:
- a bearing platform for supporting a display panel comprising a color filter substrate, an array substrate and a sealant layer between the color filter substrate and the array substrate;
- a light source configured to emit a light beam at a first wavelength;
- a light conversion layer supported above the bearing platform and configured to convert the light beam at the first wavelength into a light beam at a second wavelength to cure sealant in the sealant layer with the light beams at both the first wavelength and the second wavelength, and
- a light reflection layer arranged between the light conversion layer and the bearing platform, wherein the display panel is placeable on the light conversion layer,
- wherein the light beam at the first wavelength is the IR light beam, the light beam at the second wavelength is the UV light beam, and the light convention layer is made of an up-conversion light-emitting material, and the up-conversion light-emitting material is one selected from the group consisting of $NaYF_4$:Yb, Tm; $NaYF_4$:Er, Yb; $YF_3$:$Yb^{3+}$, $Tm^{3+}$; and $CaF_2(Er^{3+})$.

14. The sealant curing device according to claim 13, wherein the first wavelength is 600 nm to 1000 nm.

* * * * *